United States Patent [19]
Holden et al.

[11] Patent Number: 6,046,710
[45] Date of Patent: Apr. 4, 2000

[54] APPARATUS FORMING A BORDER FOR AN IMAGE

[75] Inventors: John Holden, Hemel Hempstead; Gareth Parry, St Albans, both of United Kingdom

[73] Assignee: Central Research Laboratories Limited, Middlesex, United Kingdom

[21] Appl. No.: 09/051,718

[22] PCT Filed: Oct. 8, 1996

[86] PCT No.: PCT/GB96/02475

§ 371 Date: Jul. 6, 1998

§ 102(e) Date: Jul. 6, 1998

[87] PCT Pub. No.: WO97/14986

PCT Pub. Date: Apr. 24, 1997

[30] Foreign Application Priority Data

Oct. 17, 1995 [GB] United Kingdom ............... 9521263

[51] Int. Cl.[7] ............................................. G09G 5/00
[52] U.S. Cl. ............................ 345/6; 345/87; 40/743
[58] Field of Search ............................ 365/87, 50, 5, 365/6, 4; 348/44; 359/462; 349/15; 40/743, 700, 713, 714

[56] References Cited

U.S. PATENT DOCUMENTS 3,582,961  6/1971  Shindo ........................... 348/44
3,701,581  10/1972  Henkes, Jr. .................... 359/463
4,335,936  6/1982  Nonomura et al. ............. 345/4
4,953,949  9/1990  Dallas ........................... 345/6

FOREIGN PATENT DOCUMENTS

| 0 663 603 | 7/1995 | European Pat. Off. . |
| 2 609 941 | 7/1988 | France . |
| 6-143529 | 5/1994 | Japan . |
| 2 167 879 | 6/1986 | United Kingdom . |
| WO 93/13699 | 7/1993 | WIPO . |
| WO 95/27228 | 10/1995 | WIPO . |

*Primary Examiner*—Dennis-Doon Chow
*Attorney, Agent, or Firm*—Evenson, McKeown, Edwards & Lenahan, PLLC

[57] ABSTRACT

An apparatus forming a border for an image comprises a first pattern (3) and a further pattern (4) superimposed on but spaced from the fist pattern, the patterns comprising visually contrasting areas, overlying portions of the first pattern and the further pattern being such as to form a resultant pattern (5) appearing to lie in front of and/or behind the plane of the border. The first pattern and/or further pattern changes with time and comprises a liquid crystal panel comprising an array of addressable picture elements.

17 Claims, 3 Drawing Sheets

APPARATUS FORMING A BORDER FOR AN IMAGE

BACKGROUND OF THE INVENTION

This invention relates to a border for a display device as defined in the preamble of claim 1.

When an observer views a substantially planar image (such as that formed on a television screen or a painting) the brain identifies a number of visual cues which lead to the realisation that a substantially planar image is being viewed. Such flatness cues tend to contradict depth cues, such as perspective, which may be present in the image itself.

In order to make such an image appear more three dimensional, a body forming a border as described in the first paragraph may be used. Such a body is disclosed in U.S. Pat. No. 3,582,961. In this known border the first and her patterns are formed by dark stripes on a transparent lamina. When viewed together in transmission the patterns produce a resultant Moiré interference fringe pattern. When this known border is superimposed upon the peripheral edges of a pictorial image displayed on, for example, a projection screen, the flatness cues associated with the edges of the flat screen are suppressed. An illusion of depth in the image is created from monocular depth cues (e.g. perspective and obscuration) which may be present in the flat image. Such depth cues are discussed in, for example, the paper by Harold Schlosberg in the American Journal of Psychology, Volume 54, Number 4 October 1941 pp 601–605.

There are a number of disadvantages associated with the body of U.S. Pat. No. 3,582,961. For example, the patterns are one dimensional, so that motion parallax will only occur when an observer moves his or her head in a specific direction. The patterns are fixed and it is therefore difficult to alter the apparent distance between the plane of the border and the resultant pattern, other than by substitution of the original body with a different body or by physically moving one pattern.

SUMMARY OF THE INVENTION

According to the invention, there is provided a border for a display as defined in the claims. This provides the ability to vary the appearance and/or the position or plane of the resultant pattern without replacing or moving the whole body.

The presence of Moiré interference fringes in liquid crystal panels used for displays is well known and is generally considered to be a disadvantage of these displays. The inventors have realised that this disadvantage with known liquid crystal panels can be used to provide an improved border which helps create apparent depth in a substantially planar image.

The patterns are advantageously arranged such that the resultant pattern exhibits motion parallax in a plurality of directions.

BRIEF DESCRIPTION OF THE DRAWINGS

Embodiments of the invention will now be described, by way of example only, with reference to the accompanying drawings in which.

DESCRIPTION OF THE PREFERRED EMBODIMENT(S)

Figure 1:
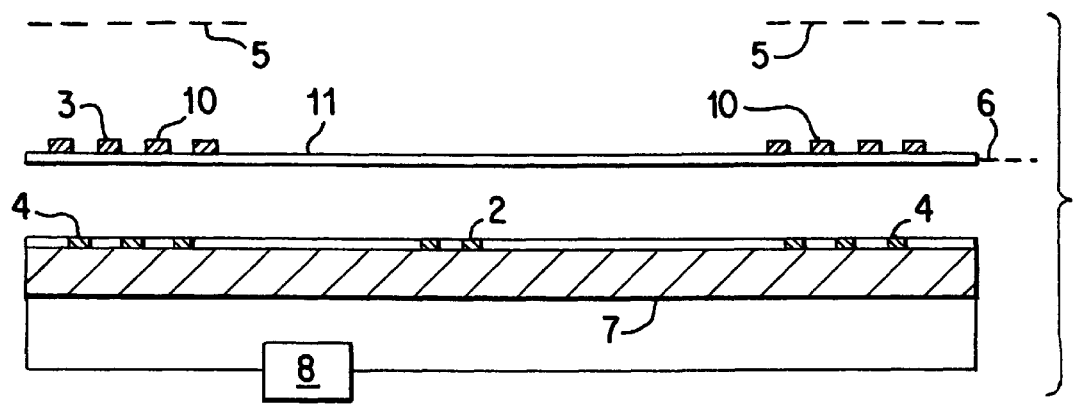
FIG. 1 shows a cross-section of a first embodiment of a border according to the invention.
Figure 3A:
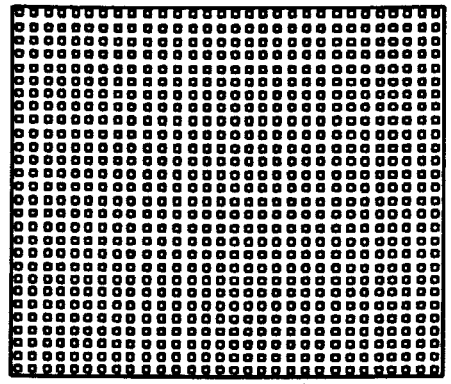
FIG. 3 shows a first pattern and two further patterns according to the invention together with the respective resultant patterns.

FIG. 1 shows an apparatus forming a border (1) for au image (2). The border comprises a first pattern (3) and a further pattern (4) superimposed on but spaced from the first pattern, the patterns comprise usually contrasting areas, overlying portions of the first pattern and the further pattern are such as to form a resultant pattern (5) which appears to lie in front of and/or behind the plane of the border (6). In the present example, the first pattern comprises a fixed pattern as shown in FIG. 3(a). The pattern is composed of areas of black ink (10) printed onto a transparent acetate sheet (11) such as an overhead view foil. The black ink areas are printed at a resolution of 600 dots per square inch so that some areas appear black and opaque whilst other areas appear transparent. Thus the pattern comprises visually contrasting areas. In the present example the acetate sheet has a clear transparent centre portion through which the image (2) may be viewed. As an alternative the first pattern could comprise a sheet having the centre portion removed.

The further pattern (4) in this first embodiment comprises a pattern formed by the light and dark electronically addressable picture elements (or pixels) of a liquid crystal display device (7). In the present example, the liquid crystal display device is arranged as a large rectangular substantially flat display which displays the ie (2) in the centre portion and the further pattern (4) in the outer region substantially surrounding the image (2). The liquid crystal display also comprises control means in the form of a driver circuit (8), such that the further pattern may be changed with time.

In order to produce a border according to the present invention, the first pattern (a fixed pattern on the transparent sheet) is placed adjacent the front face of the liquid crystal device. The further pattern is then generated (by a computer program in the present example) and displayed on the liquid crystal display. The nature of the patterns are such that the two overlying patterns produce a Moire interference pattern as a resultant pattern when the further pattern is viewed through the first pattern. This resultant pattern can be made to appear in a plane in front of the image or behind the image. The position of the resultant pattern depends upon the relative pitches of the two patterns and the distance between the two patterns.

Figure 3B:
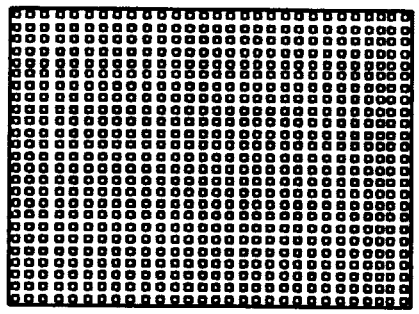
Figure 3C:
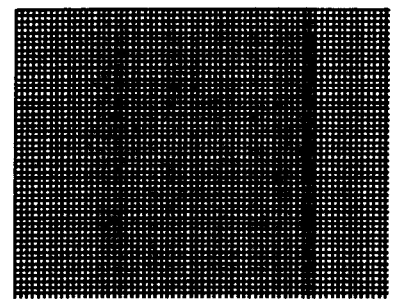

The pattern produced on the liquid crystal display (i.e. the further pattern 4 in this example) can be easily changed under software control to give another different resultant pattern without replacing either pattern physically. The resultant pattern may thus be changed as a function of time simply by changing the pattern displayed by the liquid crystal display (LCD). Animated patterns providing moving resultant patterns may thus be generated. Examples of actual patterns which can be employed are illustrated in FIG. 3. In this Figure, the first pattern (which in the embodiment of FIG. 1 comprised a fixed pattern on a transparent sheet) is shown in FIG. 3(a). The pattern is in the form of transparent areas in a two dimensional array with a repeat distance of 11 arbitrary units. FIGS. 3(b) and 3(c) show two different further patterns generated and displayed by the LCD. The electronic pattern in FIG. 3(b) is composed of transparent us of a given shape repeated every 10 arbitrary units in a two dimensional array. The electronic pattern in FIG. 3(c) is composed of transparent features of a different shape also repeated every 10 arbitrary units in a two dimensional array.

Figure 3D:
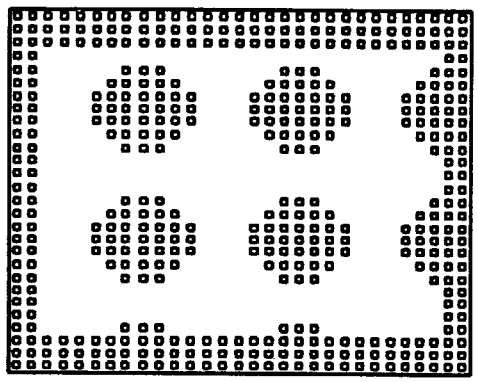
Figure 3E:
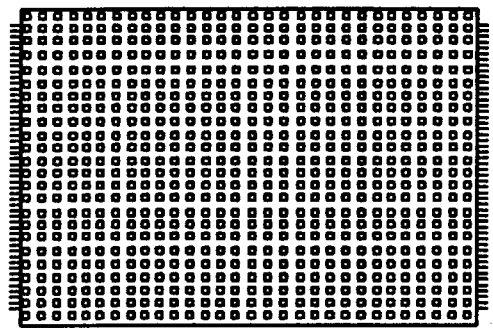
Figure 4A:
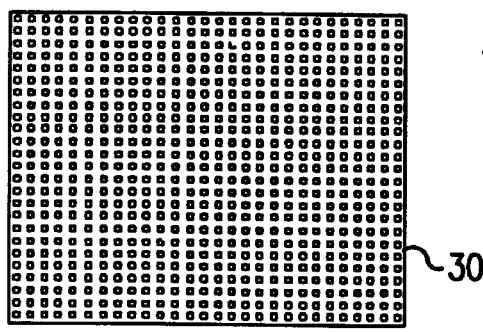
FIG. 4 shows other sets of patterns according to the invention.
Figure 4B:
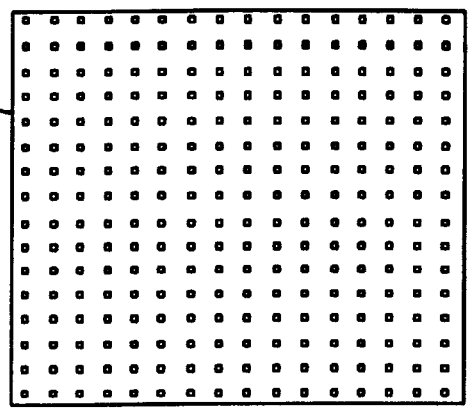
Figure 4C:
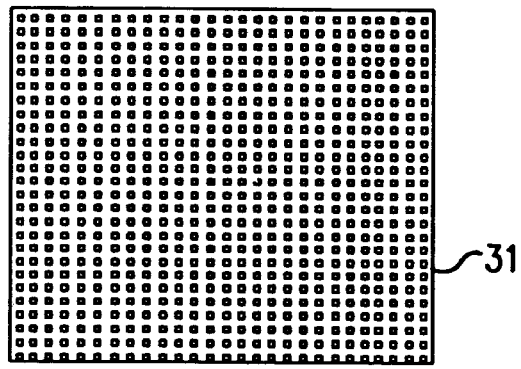
Figure 4D:
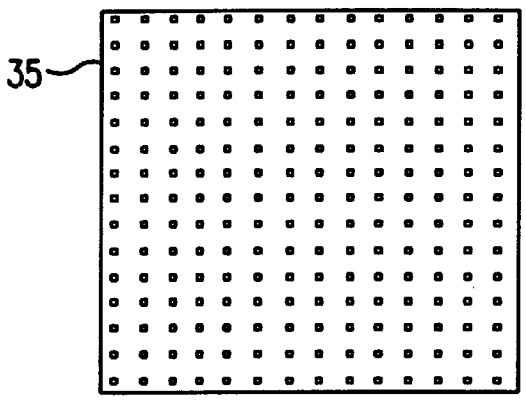
Figure 4E:
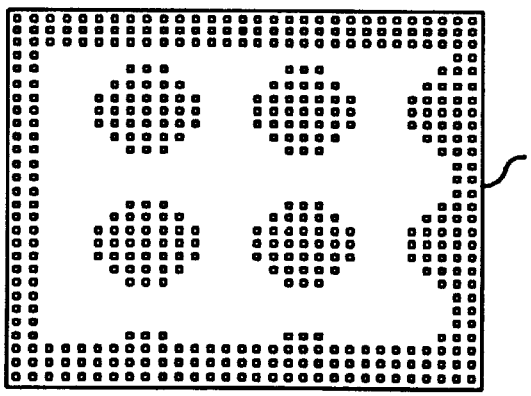
Figure 4F:
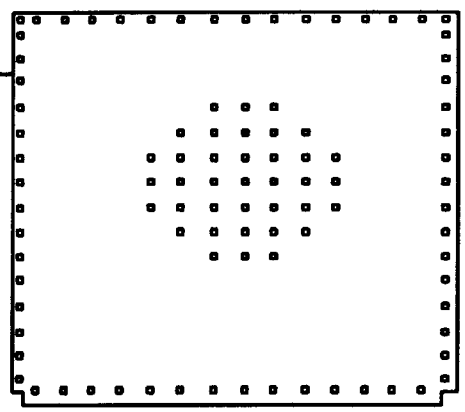

The resultant Moiré interference pattern seen by an observer whilst viewing the patterns shown in FIG. 3(a) and 3(b) together is shown in FIG. 3(d). The resultant Moiré interference pattern seen by an observer whilst viewing the patterns shown in FIG. 3(a) and 3(c) together is shown in FIG. 3(e). The two resultant patterns can be seen to be different in the two cases. If a third different electronically controlled pattern is produced, then a third different resultant pattern will be obtained. Many different patterns can be produced in this way. If the electronically controlled pattern is changed rapidly as a function of time a rapidly changing resultant pattern is observed.

Although in the above example the further pattern comprises a liquid crystal display, many other types of display such as an electroluminescent panel or a plasma discharge display or a cathode ray tube may be used as an alternative.

Figure 2:
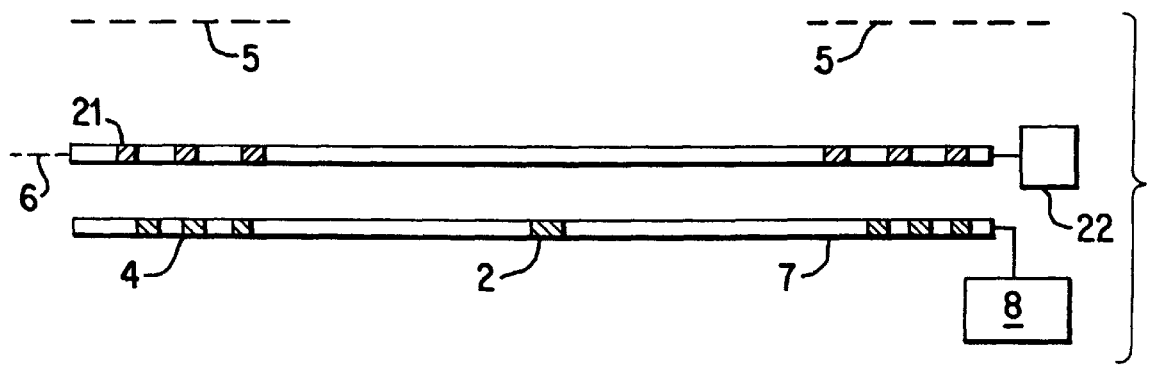
FIG. 2 shows a cross section of a second embodiment of a border.

A second embodiment according to the invention is shown in FIG. 2. This embodiment is similar to the embodiment shown in FIG. 1, except for the fact that the first pattern is no longer fixed, but is formed from more and less light transmissive pixels of an LCD (21) having electronic control means (22) for addressing the pixels.

In this second embodiment, the display device facing the observer must be operated in a transmissive mode so that both patterns are seen and form a resultant pattern in a different plane from that of the image or either display. This second embodiment has all the advantages of the first described above, but exhibits the ability to display a bigger range of resultant Moiré interference patterns without physically changing either the first or the further pattern. By way of example, the patterns in FIG. 4 show some of the combinations which become possible. Patterns 30 and 31 combine to produce the resultant pattern 33, and patterns 34 and 35 combine to produce resultant pattern 36. Pattern 30 has a repeat distance of 10 units, pattern 31 a repeat distance of 11 units, pattern 34 a repeat distance of 20 units and 35 a repeat distance of 21 units. It can be seen that the resultant patterns 33 and 36 are quite different. By producing a rapid sequence of such patterns it is possible to generate a resultant pattern which resembles a moving image.

The resultant pattern may be made to appear three dimensional by altering the relative spacing of the first and further patterns and/or changing the pattern pitches therefore changing the plane of the resultant image with time. In this way different areas of the resultant pattern may be formed at different distances above or below the plane of the first and/or further pattern. If one pattern is composed of small holes and the other is composed of an array of transparent 'T' shaped areas, the resultant pattern is in the form of an array of larger 'T's in a different plane. In this way an image of a logo can be displayed. This sort of resultant pattern is a type of integral 'photograph' of the letter T. The present invention may thus be used to produce a display of moving images in three dimensions which is of value of itself without necessarily being used as a border for a separate image as shown in the embodiments described.

The resultant patterns shown in FIG. 3 and FIG. 4 have the advantage over conventional stripe Moiré interference patterns that there is apparent motion parallax between the resultant pattern and the first or further patterns in all directions when an observer moves their point of view or when the pattern is made to change with time. For the patterns shown there is no direction in which such motion parallax can not be observed, whereas for stripe patterns motion parallel to the stripe does not produce apparent motion parallax.

In order to minimise the bulk of the border and maximise convenience, it is possible to have the border edge-lit, for example by using a conventional edge lit LCD as die first and/or further pattern. An edge lit light transmissive sheet may also be provided as a modification to the first pattern of the first embodiment described above.

Although a border which substantially surrounds the image has been described, a border which is only provided at strategic points on either side of the image will work in the same way and almost as effectively. In particular, a border which is only present at opposite comers of the image will give the three dimensional effect and thus provides a further embodiment of the invention herein described.

Finally, the content of the accompanying abstract and the priority document (Application Number GB 9521263.5) are incorporated herein by reference.

We claim:

1. A border for a display, comprising a first pattern (3) and a further pattern (4) superimposed on but spaced from the first patter the patterns comprising visually contrasting areas, overlying portions of the first pattern and the further patter being such as to form a resultant pattern (5), characterised in that the first pattern and/or further pattern comprises a liquid crystal panel (7) having an array of addressable picture elements, and control means (8) being arranged to change the first pattern and/or the further pattern with time, and that the resultant pattern appears to lie in front of or behind the plane of the border.

2. A border as claimed in claim 1 in which the resultant pattern—exhibits motion parallax relative to the first or further pattern in a plurality of directions.

3. A border as claimed in claim 2 in which the first pattern and/or the further pattern is carried on a major surface of a light transmissive sheet (11).

4. A border as claimed in claim 3 further comprising means for inputting light through an edge of the light transmissive sheet (11).

5. A border as claimed in claim 2 in which the pattern nearest the observer comprises more and less transparent areas (11, 10).

6. A border as claimed in claim 2 which is constructed and arranged to enclose the circumference of an image (2) completely or incompletely.

7. A border as claimed in claim 1 in which the first pattern and/or the further pattern is carried on a major surface of a light transmissive sheet (11).

8. A border as claimed in claim 7 in which the pattern nearest the observer comprises more and less transparent areas (11, 10).

9. A border as claimed in claim 7 which is constructed and arranged to enclose the circumference of an image (2) completely or incompletely.

10. A border as claimed in claim 7 further comprising means for inputting light through an edge of the light transmissive sheet (11).

11. A border as claimed in claim 10 in which the pattern nearest the observer comprises more and less transparent areas (11, 10).

12. A border as claimed in claim 10 which is constructed and arranged to enclose the circumference of an image (2) completely or incompletely.

13. A border as claimed in claim 1 in which the pattern nearest the observer comprises more and less transparent areas (11, 10).

14. A border as claimed in claim 13 which is constructed and arranged to enclose the circumference of an image (2) completely or incompletely.

15. A border as claimed in claim 1 which is constructed and arranged to enclose the circumference of an image (2) completely or incompletely.

16. A display device having a display area —including a border comprising a first pattern (3) and a further pattern (4) superimposed on but spaced from the first pattern, the patterns comprising visually contrasting areas, overlying portions of the first pattern and the further pattern being such as to form a resultant pattern (5), characterized in that the first pattern and/or further pattern comprises a liquid crystal panel (7) having an array of addressable picture elements, and control means (8) being arranged to chance the first pattern and/or the further pattern with time, and that the resultant pattern appears to lie in front of or behind the plane of the border.

17. A display device as claimed in claim 16 in which the display area displays both an image and the first pattern, the first pattern being located at the perimeter of the image.

\* \* \* \* \*